United States Patent
Mansour et al.

(10) Patent No.: US 7,751,833 B2
(45) Date of Patent: Jul. 6, 2010

(54) SYSTEM AND METHOD FOR DETERMINING A BASE TRANSCEIVER STATION LOCATION

(75) Inventors: Nagi A. Mansour, Arlington, VA (US); Shane D. Chapman, Herndon, VA (US)

(73) Assignee: Nextel Communications Inc., Reston, VA (US)

( * ) Notice: Subject to any disclaimer, the term of this patent is extended or adjusted under 35 U.S.C. 154(b) by 850 days.

(21) Appl. No.: 11/079,078

(22) Filed: Mar. 15, 2005

(65) Prior Publication Data

US 2006/0211431 A1    Sep. 21, 2006

(51) Int. Cl.
*H04W 24/00* (2009.01)

(52) U.S. Cl. ............ 455/456.2; 455/456.1; 455/560; 455/41.2; 455/502; 455/456.5; 342/357.08; 342/357.12

(58) Field of Classification Search ... 455/456.1–456.2, 455/446, 424, 67.11, 5, 456.5, 561, 502, 455/41.2; 342/450, 357.08, 357.12; 701/213; 370/338

See application file for complete search history.

(56) References Cited

U.S. PATENT DOCUMENTS

| | | | |
|---|---|---|---|
| 4,209,787 A * | 6/1980 | Freeny, Jr. ............... 342/457 |
| 5,570,412 A * | 10/1996 | LeBlanc ................ 455/456.2 |
| 5,787,344 A * | 7/1998 | Scheinert ............... 455/422.1 |
| 5,926,133 A * | 7/1999 | Green, Jr. ................ 342/363 |
| 6,121,928 A * | 9/2000 | Sheynblat et al. ......... 342/463 |
| 6,314,299 B1 * | 11/2001 | Schreib et al. ............ 455/465 |
| 6,327,473 B1 * | 12/2001 | Soliman et al. .......... 455/456.1 |
| 6,484,031 B1 * | 11/2002 | Ruutu et al. ............ 455/456.1 |
| 6,728,637 B2 * | 4/2004 | Ford et al. ................ 701/213 |
| 6,744,403 B2 * | 6/2004 | Milnes et al. .......... 342/357.07 |
| 6,810,269 B1 * | 10/2004 | Aramaki ................. 455/560 |
| 6,952,181 B2 * | 10/2005 | Karr et al. ............... 342/457 |
| 7,155,244 B2 * | 12/2006 | Edge ..................... 455/502 |
| 7,277,054 B2 * | 10/2007 | Alanen et al. ............. 342/464 |
| 7,298,327 B2 * | 11/2007 | Dupray et al. ............ 342/451 |
| 7,319,878 B2 * | 1/2008 | Sheynblat et al. ........ 455/456.3 |
| 7,440,983 B2 * | 10/2008 | Sairo et al. ................... 1/1 |
| 7,623,872 B2 * | 11/2009 | Kennedy et al. ......... 455/456.1 |
| 2001/0039192 A1 * | 11/2001 | Osterling et al. .......... 455/502 |
| 2003/0125046 A1 * | 7/2003 | Riley et al. .............. 455/456 |
| 2003/0146871 A1 * | 8/2003 | Karr et al. ............... 342/457 |
| 2003/0222820 A1 * | 12/2003 | Karr et al. ............... 342/457 |
| 2004/0046693 A1 * | 3/2004 | Ogino et al. .......... 342/357.08 |
| 2004/0204097 A1 * | 10/2004 | Scheinert et al. .......... 455/561 |
| 2005/0181805 A1 * | 8/2005 | Gallagher .............. 455/456.1 |
| 2007/0111737 A1 * | 5/2007 | Swope et al. ............ 455/456.2 |
| 2008/0220768 A1 * | 9/2008 | Bose et al. .............. 455/426.1 |
| 2009/0088179 A1 * | 4/2009 | Stuempert et al. ........ 455/456.1 |

FOREIGN PATENT DOCUMENTS

WO    WO 2005013636 A1 *    2/2005

* cited by examiner

*Primary Examiner*—Sharad Rampuria

(57) ABSTRACT

A system and method for determining the location of a base transceiver station (BTS) are provided. A personal BTS can determine its location using information transmitted by neighboring BTSs or from mobile station transmissions to neighboring BTSs. If the personal BTS cannot determine its location using information from neighboring BTSs or from mobile station transmissions, the personal BTS can contact a cellular network operator to request that a technician come out to verify the location.

9 Claims, 5 Drawing Sheets

SYSTEM AND METHOD FOR DETERMINING A BASE TRANSCEIVER STATION LOCATION

BACKGROUND OF THE INVENTION

Due to decreasing costs of usage and increased coverage areas, the use of cellular communications continues to increase at a rapid pace. Some consumers have replaced their wireline telephone service with cellular telephone service. However, not all consumers have this option. Specifically, some consumers cannot receive acceptable signals for cellular communications within their residence due to either lack of coverage by a cellular network operator or due to the attenuation of signals by the building structure of the residence.

To address the problems encountered by consumers desiring cellular network coverage within their residence, some cellular network operators are investigating personal base transceiver stations (BTSs). These personal BTSs typically act similar to BTSs used in the cellular network operators' macro networks and use a consumer's broadband Internet connection to backhaul the communication signals between the personal BTS and the cellular network operator's macro network.

Cellular network operators are licensed to operate on particular frequencies by government bodies. The licensed frequencies may vary for different geographical areas for a cellular network operator. Cellular network operators who cause interference outside of their licensed frequencies may face repercussions, such as fines, by government bodies. Accordingly, cellular network operators which provide personal BTSs may need to ensure that the personal BTSs comply with the applicable government regulations, such as operating only within their assigned frequencies for particular geographic areas.

SUMMARY OF THE INVENTION

A system and method for determining the location of a personal base transceiver station (BTS) are provided. A personal BTS can determine its location using information transmitted by neighboring BTSs. If the personal BTS cannot determine its location using information received from neighboring BTSs, the personal BTS can attempt to determine its location using information transmitted by mobile stations. If the personal BTS still cannot determine its location, the personal BTS can request that a technician come out and verify the location.

DETAILED DESCRIPTION OF THE PREFERRED EMBODIMENTS

Because personal BTSs can operate in any geographic area using a broadband connection, it is necessary to determine the location of the personal BTS to ensure that it is complying with all government regulations. Although a cellular network operator can rely upon the consumer to report the location of the personal BTS to the cellular network operator, some consumers may abuse this process and report a proper location when the personal BTS is moved to another location. This abuse can result in repercussions to the cellular network operator, such as fines, by government bodies.

To combat consumer fraud in the reporting of the location of the personal BTS, the personal BTS can determine its own location using global positioning satellite (GPS) signals and report it to the cellular network operator. However, reception of GPS signals requires a line of sight to the GPS satellites. Because personal BTSs will typically be located within buildings, the personal BTSs will not have the ability to receive the GPS signals. Accordingly, methods and systems for determining the location of personal BTSs without relying upon consumers or GPS signals may be necessary.

Figure 1:
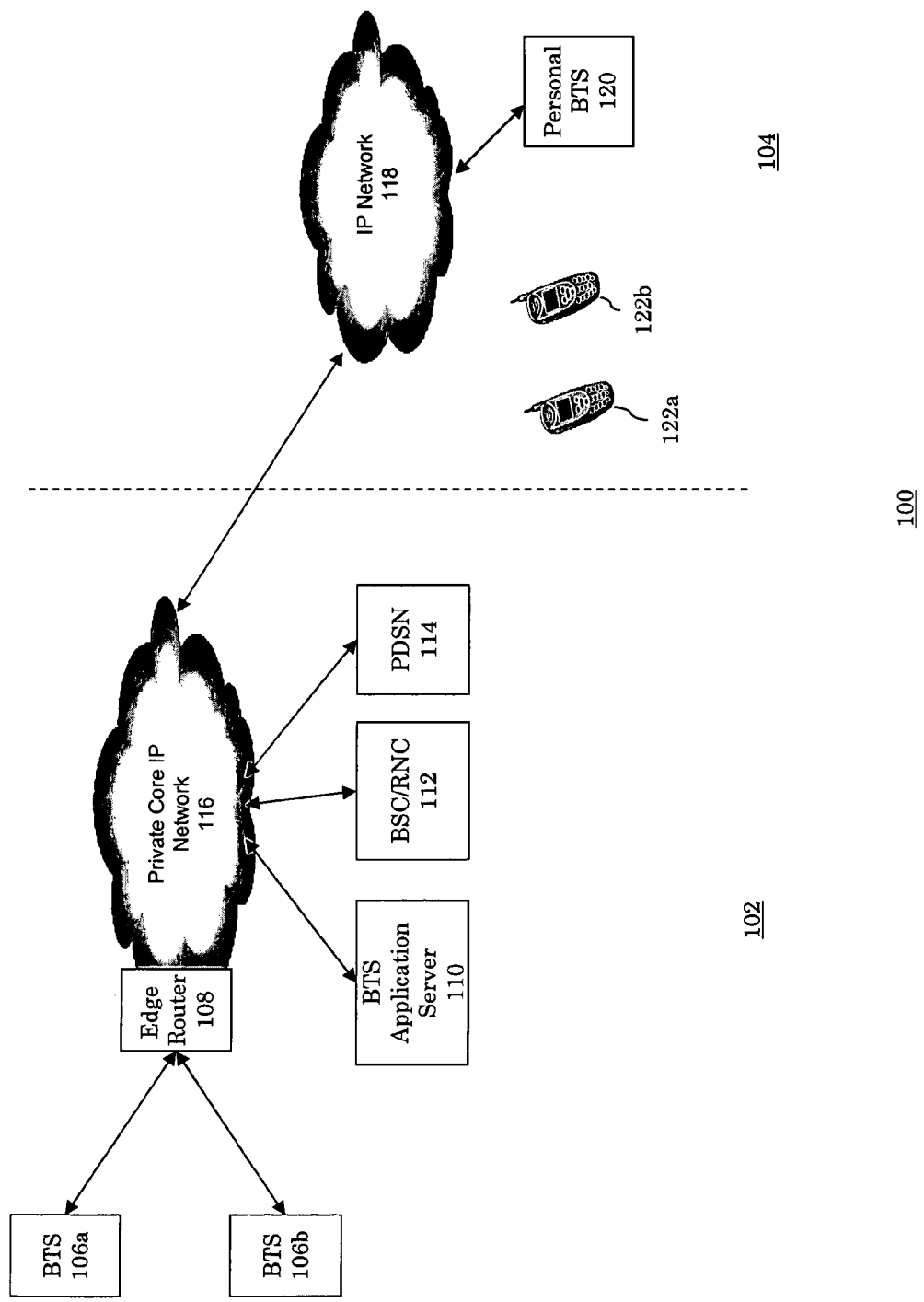
FIG. 1 illustrates an exemplary system for determining the location of a BTS in accordance with the present invention.

FIG. 1 illustrates an exemplary system for determining the location of a BTS in accordance with the present invention. The system 100 is logically divided between the macro cellular network 102 and a network 104 outside of the control of the macro cellular network operator. The macro cellular network 102 includes one or more BTSs 106a and 106b, an edge router 108, a BTS application server 110, a base station controller/radio network controller (BSC/RNC) 112, a packet data serving node (PDSN) 114 and a private core IP network 116. The other network 104 includes a public internet protocol (IP) network 118 and a personal BTS 120. One or more mobile stations 122a and 122b can operate either in the macro cellular network 102 or in the other network 104. Although FIG. 1 illustrates only a single personal BTS, the disclosed system and method can support a large number of personal BTSs.

In the macro cellular network 102, BTSs 106a and 106b can use a T1/E1 connection to the edge router into the private core IP network for routing signalling and communications to the BTS application server 110, the BSC/RNC 112 and the PDSN 114. The BSC/RNC operate as a conventional BSC/RNC by controlling the operation of BTS 106a and 106b. The BTS application server 110 can provide applications for use by the BTS 106a and 106b. The PDSN 114 can be used for packet data or dispatch voice communication control.

The personal BTS 120 connects through the public IP network 118 to the private core IP network 116. This allows routing of communications between the personal BTS and the macro cellular network 116. The mobile stations 122a and 122b are designed to communicate with the personal BTS 120 using the same protocols as those used to communicate with BTSs in the macro cellular network 102. Moreover, the mobile stations 122a and 122b include GPS receivers.

Figure 2:
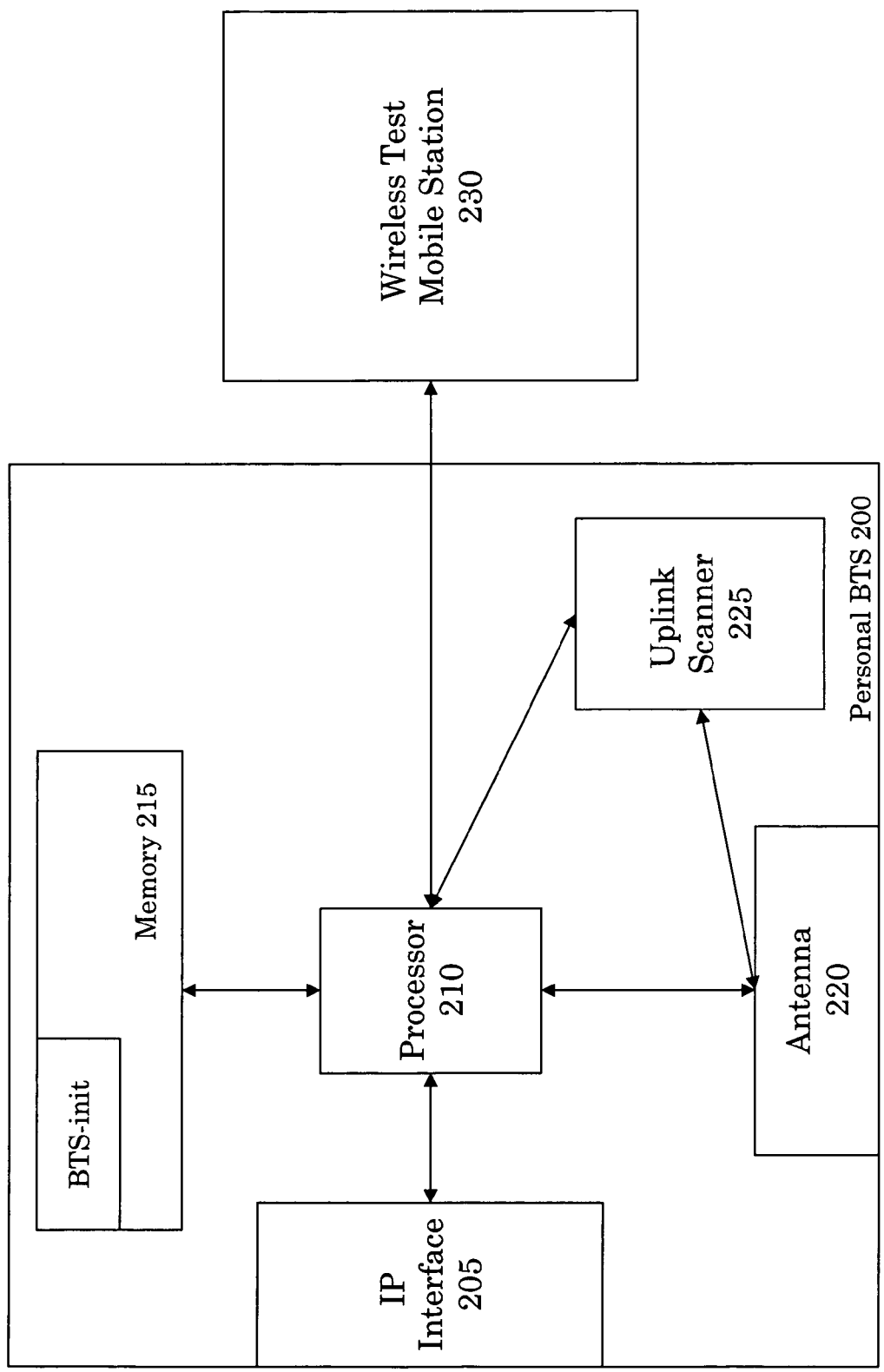
FIG. 2 illustrates an exemplary BTS and mobile station in accordance with the present invention.

FIG. 2 illustrates an exemplary personal BTS and mobile station in accordance with the present invention. The personal BTS 200 includes an IP interface 205, processor 210, memory 215, antenna 220 and uplink scanner 225. Coupled to the personal BTS 200 is a wireless test mobile station 230. The memory 215 includes a BTS-init program which is used for initializing the personal BTS 200 when it is first powered on, or following a reset of the personal BTS 200.

The IP interface 205 is coupled to a public IP network (not shown) and to the processor 210. The IP interface 205 provides any necessary protocol conversion between the processor 210 and an IP network. Processor 210 is coupled to memory 215, antenna 220, uplink scanner 225 and wireless test mobile station 230. The processor can be a microprocessor, application specific integrated circuit (ASIC), hard-wired logic, field programmable gate-array (FPGA), or the like. The memory 215 can be any type of memory such as random access memory (RAM), flash memory, a hard drive, or the like.

The uplink scanner 225 is a radio receiver which is capable of tuning to frequencies used by mobile stations to transmit to BTSs. The antenna 220 is a conventional antenna designed for transmitting and receiving at frequencies used for communication with mobile stations. The wireless test mobile station 230 can be any type of conventional mobile station, and can include a GPS receiver. Although the wireless test mobile station 230 is illustrated as being external to the personal BTS 200, the wireless test mobile station 230 can be placed inside the personal BTS 200. When the wireless test mobile station 230 is placed inside the personal BTS 200, the wireless test mobile station 230 can be implemented on a circuit board, or in a computer chip (such as a microprocessor, ASIC, FPGA, or the like). The operation of the various components of FIG. 2 will be described below in connection with the method illustrated in FIGS. 3a-c.

Figure 3A:
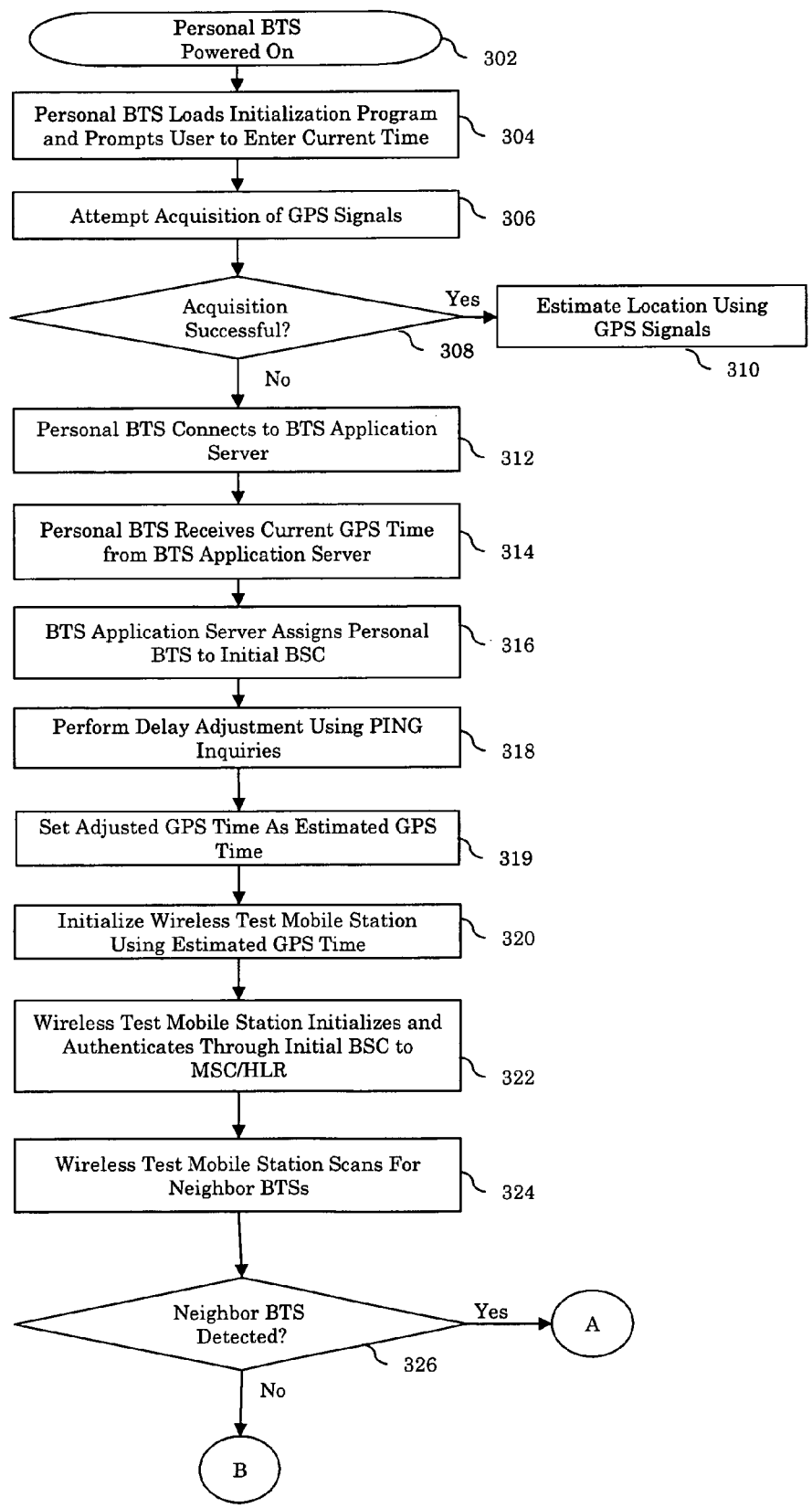
FIGS. 3a-c illustrate an exemplary method for determining the location of a BTS in accordance with the present invention.
Figure 3B:
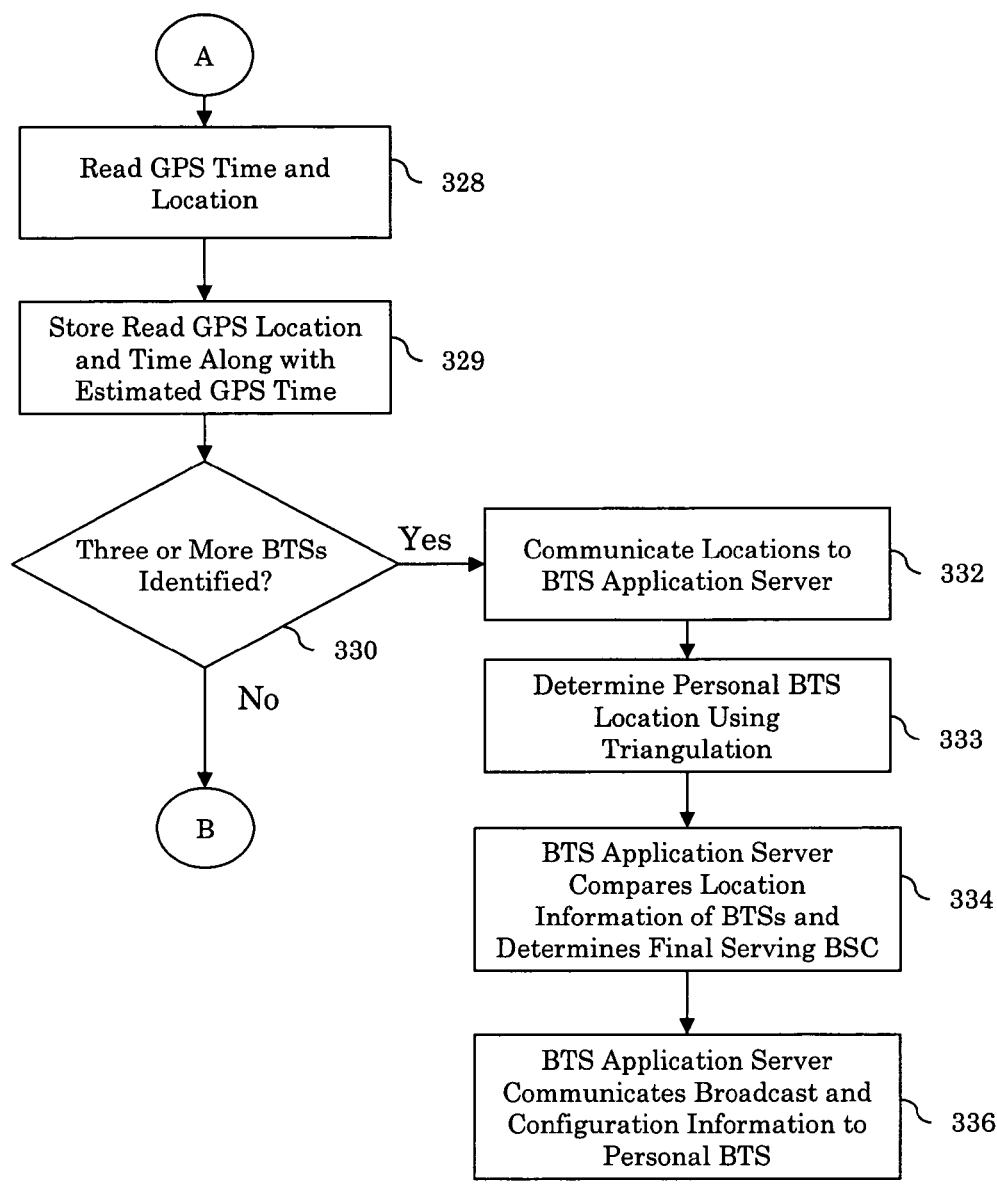
Figure 3C:
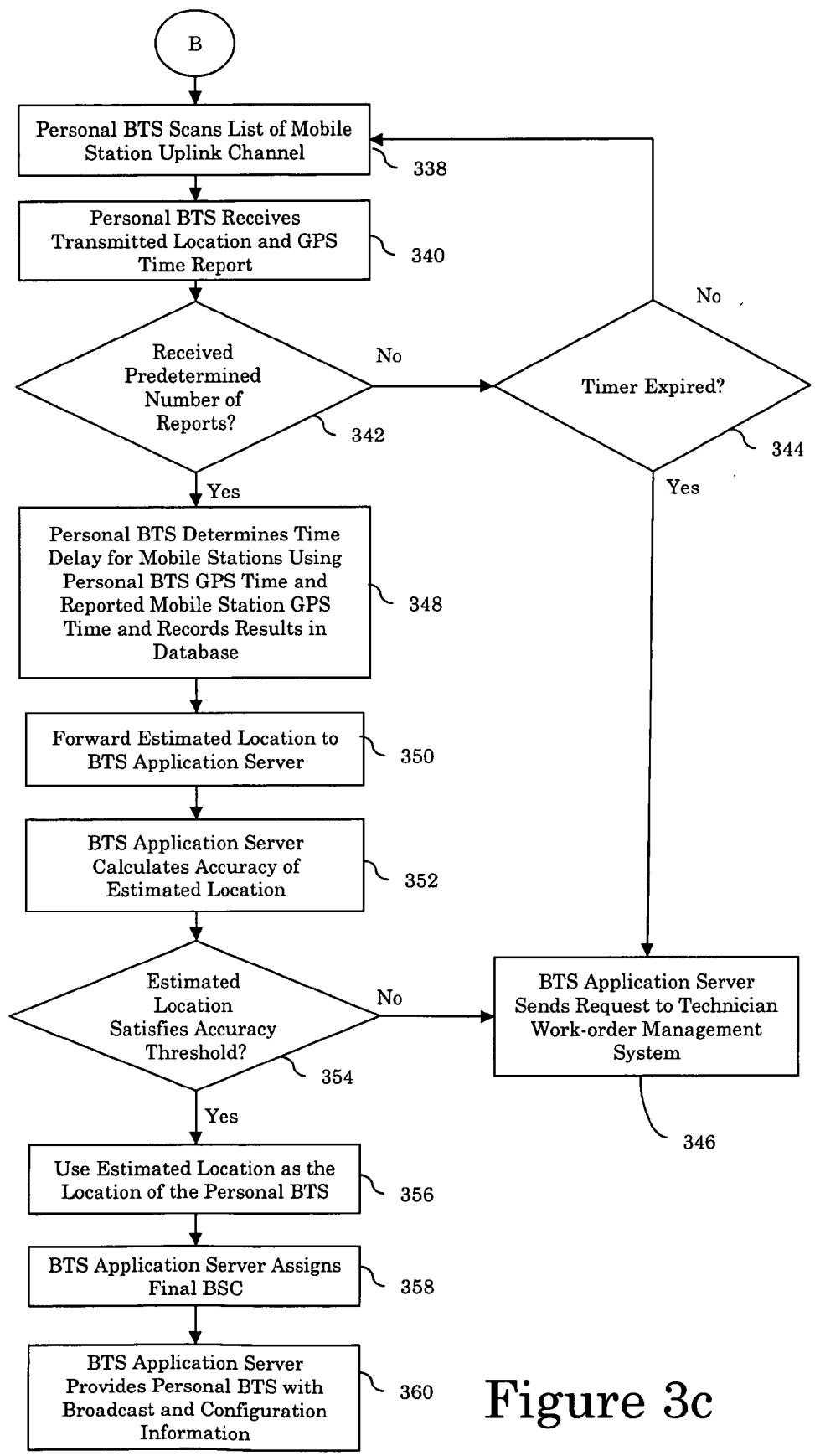

FIGS. 3a-c illustrate an exemplary method for determining the location of a personal BTS in accordance with the present invention. When the personal BTS is powered on (step 302) the processor 210 loads an initialization program BTS-init, from memory 215, and prompts a user to enter the current time (step 304). The personal BTS, using wireless test mobile station 230, then attempts to acquire GPS signals (step 306). If the personal BTS acquires the GPS signals ("Yes" path out of decision step 308), then the personal BTS estimates its location using the GPS signals (step 310).

If the personal BTS cannot successfully acquire GPS signals ("No" path out of decision step 308), then the personal BTS connects to the BTS application server using IP interface 205 (step 312) and receives the current GPS time from the BTS application server using network time protocol (NTP) or any other protocol (step 314). The personal BTS connects to the BTS application server via a private tunnel of a virtual private network (VPN). The BTS application server assigns the personal BTS to an initial BSC (step 316). The BTS application server and the personal BTS exchange PING inquires to determine an average delay. Using the average delay, the BTS-init adjusts the GPS time received from the BTS application server (step 318). The BTS-init compares the adjusted GPS time to the user entered time, and if the two times are within several minutes of each other, then the BTS-init uses the adjusted GPS time as an estimated GPS time (step 319). The comparison of the user entered time and the adjusted GPS time is a check performed to ensure that the adjusted GPS time is reasonably accurate. If the adjusted GPS time is not reasonably accurate, the BTS-init can send another request for the GPS time to the BTS application server, and the two would perform the PING inquires to generate a new adjusted GPS time. Because it is likely that most of the personal BTSs are located where GPS signals cannot be received, steps 306, 308 and 310 may be omitted if desired.

The personal BTS initializes the wireless test mobile station 230 using the estimated GPS time (step 320). The wireless test mobile station 230 then initializes and authenticates itself through the initial BSC to the MSC/HLR associated with the initial BSC using the connection to processor 210 (step 322). The wireless test mobile station 230 then scans downlink frequencies to detect neighbouring BTSs (step 324). The neighbouring BTSs can be BTSs of a cellular macro network or other personal BTSs.

If one or more neighbouring BTSs are detected ("Yes" path out of decision step 326), then the wireless test mobile station 230 reads the GPS time and location of the neighbouring BTSs by examining broadcast messages (step 328). The personal BTS stores the GPS time and location, as well as the local estimated GPS time when the GPS time and location were received, in a memory (step 329). If three or more neighbouring BTSs are identified and the GPS time and location have been received ("Yes" path out of decision step 330), then the information received from the neighbouring BTSs, as well as the local estimated GPS time when this information was received, is communicated to the BTS application server (step 332). Specifically, using the connection to processor 210, the wireless test mobile station provides the information to the processor 210. The processor 210 transmits the information to the BTS application server using IP interface 205.

Using triangulation techniques, the BTS application server employs the GPS time and location received from the BTSs, as well as the local estimated GPS time when the GPS time and location information was received, to determine the location of the personal BTS (step 333). The BTS application server compares the location information of the BTSs and determines a final serving BSC for the personal BTS (step 334). The BTS application server communicates broadcast and configuration information to the personal BTS (step 336). The broadcast and configuration information can include radio channel assignments, allowed power levels, PN offset assignments, paging assignments and the like.

If no neighbouring BTSs are detected ("No" path out of decision step 326), or if less than three BTSs are identified ("No" path out of decision step 330), then the personal BTS scans a list of mobile station uplink channels using uplink scanner 225 (step 338). The uplink scanner 225 attempts to decode mobile station transmissions of location updates with other BTSs. The uplink 225 scanner of the personal BTS receives transmitted GPS time and location from the uplink channels (step 338) and stores the received information in a database of memory 215. The personal BTS determines whether it has received a predetermined number of reports (step 342).

If the personal BTS has not received a predetermined number of reports ("No" path out of decision step 342), then the personal BTS determines whether a timer has expired (step 344). If the timer has not expired ("No" path out of decision step 344), then the personal BTS continues to scan mobile station uplink channels (step 338). If, however, the timer has expired ("Yes" path out of decision step 344), then the BTS application server sends a request to a technician work order management system for a technician to come out and verify the location of the personal BTS (step 346).

If the personal BTS has received a predetermined number of reports ("Yes" path out of decision step 342), then the personal BTS determines a time delay for the mobile stations using the personal BTS GPS time and the reported mobile station GPS time and location, and the personal BTS records the results in a database (step 348). The personal BTS then forwards the estimated location to the BTS application server (step 350).

The BTS application server calculates the accuracy of the estimated location (step 352) and determines whether the estimated location satisfies an accuracy threshold (step 354). The accuracy is based upon the accuracy of the personal BTS GPS time, and the reported mobile station GPS time and location. If the estimated location does not satisfy an accuracy threshold ("No" path out of decision step 354), then the BTS application server sends a request to the technician work-order management system for a technician to come out and verify the location of the personal BTS (step 346). If, however, the estimated location satisfies the accuracy threshold ("Yes" path out of decision step 354), then the BTS application server uses the estimated location as the location of the personal BTS (step 356). The BTS application server uses the location of the personal BTS to determine a final serving BSC (step 358), initiates a software build request for the final BSC, and communicates the broadcast and configuration information to the personal BTS (step 360). To ensure that the personal BTS continues to be located at the location reported to the cellular network, the personal BTS can be programmed to periodically perform the method of FIGS. 3a-c.

Although the method of FIGS. 3a-c is described above with the BTS application server as determining the location of the personal BTS when the location is to be determined using information received from other BTSs, this determination can be performed in the personal BTS. Moreover, although the method of FIGS. 3a-c is described above with the personal BTS determining its location using information received from mobile stations, this location determination can be performed by the BTS application server.

While the invention has been described in connection with various embodiments, it will be understood that the invention is capable of further modifications. This application is intended to cover any variations, uses or adaptation of the invention following, in general, the principles of the invention, and including such departures from the present disclosure as, within the known and customary practice within the art to which the invention pertains.

What is claimed is:

1. A method for determining a location of a base station comprising the acts of:
   assigning the base station to an initial base station controller;
   determining the location of the base station using wireless communication signals monitored by the base station; and
   determining a final serving base station controller for the base station based on the determined location of the base station,
   wherein the base station is at a same location when the initial base station controller is assigned and the final serving base station controller is determined,
   wherein the wireless communication signals comprise signals transmitted from base stations,
   wherein when the base station cannot determine its location from information in the wireless communication signals transmitted from the base stations, the wireless communication signals further comprise signals transmitted by mobile stations, and the location of the base station is determined using information in the signals transmitted by the mobile stations, and
   wherein signals transmitted by the mobile stations comprise location update messages which include a GPS time and location.

2. A method for determining a location of a base station comprising the acts of:
   determining that the location cannot be determined using received global positioning satellite (GPS) signals;
   monitoring wireless communication signals; and
   determining the location of the base station using the monitored wireless communication signals,
   wherein the wireless communication signals comprise signals transmitted from base stations,
   wherein when the base station cannot determine its location from information in the wireless communication signals transmitted from the base stations, the wireless communication signals further comprise signals transmitted by mobile stations, and the location of the base station is determined using information in the signals transmitted by the mobile stations, and
   wherein signals transmitted by the mobile stations comprise location update messages which include a GPS time and location.

3. The method of claim 1, wherein the base station communicates with mobile stations using a code division multiple access (CDMA) scheme.

4. The method of claim 1, wherein when the location of the base station cannot be determined using the monitored wireless communication signals, the method comprises the act of:
   transmitting a message to a cellular network operator requesting a technician to verify the location of the base station.

5. The method of claim 1, wherein the base station communicates with a cellular macro network over a consumer's Internet connection.

6. A method for determining a location of a base station comprising the acts of:
   assigning the base station to an initial base station controller;
   determining the location of the base station using wireless communication signals monitored by the base station, wherein the location is determined by triangulation using global positioning satellite (GPS) time and location information in the monitored wireless communication signals; and
   determining a final serving base station controller for the base station based on the determined location of the base station, wherein the GPS time and location information is broadcast from at least three base stations,
   wherein when the base station cannot determine its location from information in the wireless communication signals transmitted from the base stations, the wireless communication signals further comprise signals transmitted by mobile stations, and the location of the base station is determined using information in the signals transmitted by the mobile stations, and
   wherein signals transmitted by the mobile stations comprise location update messages which include a GPS time and location.

7. A method for determining a location of a base station comprising the acts of:
   monitoring wireless communication signals transmitted by at least one other base station or at least one mobile station; and
   determining the location of the base station using the monitored wireless communication signals, wherein the location is determined by triangulation using global positioning satellite (GPS) time and location information in the monitored wireless communication signals,
   wherein when the base station cannot determine its location from information in wireless communication signals transmitted from base stations, the wireless communication signals further comprise signals transmitted by at least one mobile station and the signals transmitted by the at least one mobile station comprises location update messages which include the GPS time and the location.

8. The method of claim 6, wherein when the location of the base station cannot be determined using the monitored wireless communication signals, the method comprises the act of:
   transmitting a message to a cellular network operator requesting a technician to verify the location of the base station.

9. The method of claim 6, wherein the base station communicates with a cellular macro network over a consumer's Internet connection.

* * * * *